United States Patent
Zhou et al.

(10) Patent No.: US 9,756,579 B2
(45) Date of Patent: Sep. 5, 2017

(54) NEAR FIELD COMMUNICATION SYSTEM AND METHOD FOR CONTROLLING TRANSMISSION POWER OF NEAR FIELD COMMUNICATION SYSTEM

(71) Applicant: Board of Trustees of Michigan State University, East Lansing, MI (US)

(72) Inventors: Ruogu Zhou, Lansing, MI (US); Guoliang Xing, Okemos, MI (US)

(73) Assignee: BOARD OF TRUSTEES OF MICHIGAN STATE UNIVERSITY, East Lansing, MI (US)

(*) Notice: Subject to any disclaimer, the term of this patent is extended or adjusted under 35 U.S.C. 154(b) by 0 days.

(21) Appl. No.: 15/029,236

(22) PCT Filed: Oct. 17, 2014

(86) PCT No.: PCT/US2014/061132
§ 371 (c)(1),
(2) Date: Apr. 13, 2016

(87) PCT Pub. No.: WO2015/058082
PCT Pub. Date: Apr. 23, 2015

(65) Prior Publication Data
US 2016/0242124 A1    Aug. 18, 2016

Related U.S. Application Data

(60) Provisional application No. 61/892,720, filed on Oct. 18, 2013.

(51) Int. Cl.
*H04B 7/00* (2006.01)
*H04W 52/24* (2009.01)
(Continued)

(52) U.S. Cl.
CPC ........ *H04W 52/246* (2013.01); *G06K 7/0008* (2013.01); *G06K 7/10366* (2013.01); *H04W 4/008* (2013.01)

(58) Field of Classification Search
None
See application file for complete search history.

(56) References Cited

U.S. PATENT DOCUMENTS 6,111,239 A   8/2000 Park
6,462,316 B1  10/2002 Berkcan et al.
(Continued)

FOREIGN PATENT DOCUMENTS

EP   1146455 A2   10/2001
EP   2063183 A2   5/2009
EP   2098788 A2   9/2009

OTHER PUBLICATIONS

International Search Report for International Application No. PCT/US2014/061132 mailed Jan. 19, 2015.
(Continued)

*Primary Examiner* — Fayyaz Alam
(74) *Attorney, Agent, or Firm* — Howard & Howard Attorneys PLLC

(57) ABSTRACT

A near field communication (NFC) system and method for controlling transmission power of the NFC system includes a NFC reader configured to transmit a radio frequency (RF) signal having an initial amount of RF power, a NFC target device in selective communication with the NFC reader, and a NFC transmission power control platform disposed between the NFC reader and the NFC target device. The platform includes a microcontroller and at least one circuit in communication with the microcontroller and configured to determine an actual amount of RF power needed to sustain near field communications between the NFC reader and the NFC target device and configured to regulate the RF (Continued)

signal, where the regulated RF signal contains the actual amount of RF power needed to sustain near field communications between the NFC reader and the NFC target device.

19 Claims, 8 Drawing Sheets

(51) Int. Cl.
*G06K 7/00* (2006.01)
*G06K 7/10* (2006.01)
*H04W 4/00* (2009.01)

(56) References Cited

U.S. PATENT DOCUMENTS

| | | |
|---|---|---|
| 8,308,350 B2 | 11/2012 | Yasuda et al. |
| 8,754,351 B2 | 6/2014 | England et al. |
| 9,074,948 B2 | 7/2015 | Rankin |
| 9,285,280 B2 | 3/2016 | Faden |
| 9,287,935 B2 * | 3/2016 | Buckley |
| 2008/0231449 A1 | 9/2008 | Moshfeghi |
| 2008/0237215 A1 | 10/2008 | Lee et al. |
| 2010/0012645 A1 | 1/2010 | Baier |
| 2010/0123559 A1 * | 5/2010 | Wilkinson ........... G06K 7/0008 340/10.4 |
| 2012/0075148 A1 | 3/2012 | Cho |
| 2013/0048625 A1 | 2/2013 | Sladecek et al. |
| 2013/0185213 A1 * | 7/2013 | Insanic ................ H04B 5/0031 705/73 |
| 2014/0130151 A1 * | 5/2014 | Krishnamurthy ..... G06F 21/572 726/22 |
| 2015/0038074 A1 * | 2/2015 | Buckley ............... H04B 5/0031 455/41.1 |

OTHER PUBLICATIONS

Notice of Allowance and Fees Due mailed Oct. 4, 2016 for Utility U.S. Appl. No. 14/054,388.
English language abstract and translation for EP 2063183 extracted from espacenet.com database Jun. 14, 2016, 21 pages.
English language abstract and translation for EP 2098788 extracted from espacenet.com database Jun. 14, 2016, 15 pages.

* cited by examiner

NEAR FIELD COMMUNICATION SYSTEM AND METHOD FOR CONTROLLING TRANSMISSION POWER OF NEAR FIELD COMMUNICATION SYSTEM

CROSS-REFERENCE TO RELATED APPLICATION(S)

This application is the National Stage of International Patent Application No. PCT/US2014/061132, filed on Oct. 17, 2014, which claims priority to and all the advantages of U.S. Provisional Patent Application No. 61/892,720, filed on Oct. 18, 2013, the entire content of which is incorporated herein by reference.

GOVERNMENT RIGHTS IN THE INVENTION

This invention was made with government support under CNS0954039 awarded by the National Science Foundation. The government has certain rights in the invention.

BACKGROUND OF THE INVENTION

1. Field of the Invention

The present invention relates generally to near field communication systems, and more particularly, to a near field communication system and a method for controlling transmission power of the near field communication system.

2. Description of the Related Art

Near field communication (NFC) is a set of standards that cover communication protocols and data exchange formats based on existing radio frequency identification (RFID) standards for Smartphones, tablet computers, and other similar devices. In one example, Smartphones utilize NFC to communicate with one another when the Smartphones are placed in close proximity to one another (e.g. up to a few centimeters apart from one another). NFC may be used, for example, for contactless payments, transactions, and/or other data exchange applications.

Near field communications may be established between an NFC reader and an NFC target device (such as an NFC tag). The NFC reader may be used to transmit an NFC signal that is received by the NFC target device. In some instances, the NFC reader has a fixed transmission power, which is often high enough to establish NFC connections under most circumstances. The fixed transmission power is often sufficient to establish communications at distance of a few centimeters or higher. This high transmission power is typically more than what is needed to sustain near field communications between NFC readers and NFC target devices. The high transmission power also allows NFC signals to be transmitted over a further distance. As such, the near field communications may be susceptible to eavesdropping by third parties. Thus, there is a need in the art for a NFC system and method for controlling transmission power of the NFC system.

SUMMARY OF THE INVENTION

Accordingly, the present invention provides a near field communication (NFC) system including a NFC reader configured to transmit a radio frequency (RF) signal having an initial amount of RF power, a NFC target device in selective communication with the NFC reader, and a NFC transmission power control platform disposed between the NFC reader and the NFC target device. The NFC transmission power control platform includes a microcontroller and at least one circuit in communication with the microcontroller and configured to determine an actual amount of RF power needed to sustain near field communications between the NFC reader and the NFC target device and configured to regulate the RF signal so that the regulated RF signal contains the actual amount of RF power needed to sustain the near field communications between the NFC reader and the NFC target device.

In addition, the present invention provides a method for controlling transmission power of a near field communication (NFC) system including a NFC reader, a NFC target device, and a NFC transmission power control platform disposed between the NFC reader and the NFC target device including a microcontroller and at least one circuit in communication with the microcontroller. The method includes the steps of transmitting a radio frequency (RF) signal having an initial amount of RF power from the NFC reader, receiving the RF signal by the NFC target device, determining an actual amount of RF power needed to sustain near field communications between the NFC reader and the NFC target device with the at least one circuit, and regulating the RF signal with the at least one circuit so that the regulated RF signal contains the actual amount of RF power needed to sustain the near field communications between the NFC reader and the NFC target device.

One advantage of the present invention is that a new NFC system and method for controlling transmission power of the NFC system is provided. Another advantage of the present invention is that the NFC system and method provides a transmission power control platform between a NFC reader and a NFC target device. Yet another advantage of the present invention is that the NFC system and method provides increased security to NFC target devices with respect to eavesdropping by third parties. Still another advantage of the present invention is that the NFC system and method provides uninterrupted protection against malicious eavesdropping. Still another advantage of the present invention is that the NFC system and method dynamically attenuates the signal strength of NFC transmissions by absorbing excessive RF energy.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

As disclosed in the present application, one embodiment of an NFC system and method for controlling transmission power of the NFC system, according to the present invention, utilize an NFC transmission power control platform disposed between a NFC reader and a NFC target device. The NFC transmission power control platform ("platform") is designed to determine an amount of RF power needed to sustain near field communications between the NFC reader and the NFC target device. The platform is further designed to regulate RF power by absorbing the power in excess of the amount that is needed to sustain near field communications. The absorbed RF power (also referred to herein as the excessive RF power) may be harvested and used as an energy reserve to power the platform. It should be appreciated that the energy reserve may also be used to power any of the devices attached to the platform, such as a device(s) (e.g., sensor(s)) that is located external to the platform.

The original transmission power from the NFC reader may allow third parties to be able to successfully eavesdrop near field communications within a distance of several meters. After absorbing the original transmission power, the amount of RF power that is actually used to sustain subsequent near field communications (such as during the exchange of critical data during a contactless payment process) is lower than the amount of RF power of the original transmission from the NFC reader. Since the actual amount of RF power decreases the distance that a third party could eavesdrop the communication, it is believed that eavesdropping by a third party will be a challenge. For instance, a third party would have to be close (e.g. in terms of centimeters) to the NFC reader in order to successfully eavesdrop the near field communications. For typical off-the-shelf NFC devices, a third party would have to be within 50 centimeters of the NFC reader to successfully eavesdrop the near field communications.

Figure 1:
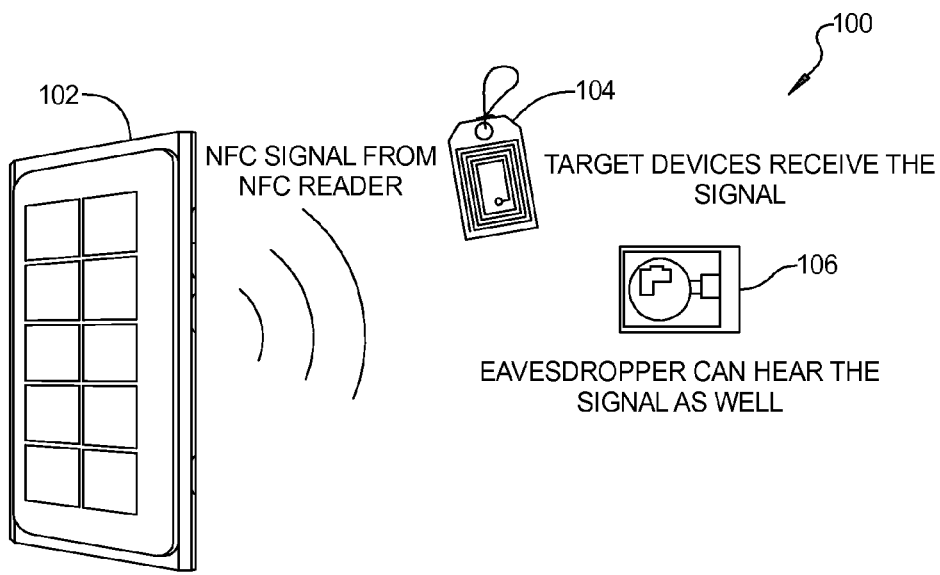
FIG. 1 is a diagrammatic view of a known NFC system, according to the prior art.
Figure 2:
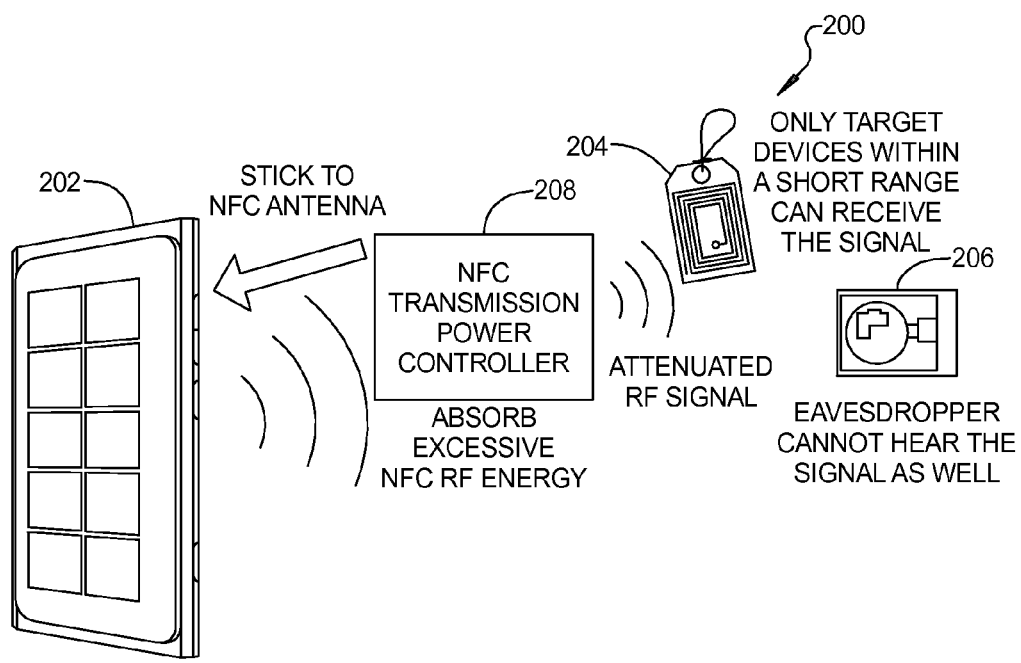
FIG. 2 is a diagrammatic view of one embodiment of a NFC system, according to the present invention.

Referring to FIG. 1, an example of a known NFC system 100, according to the prior art, is shown. This known NFC system 100 generally includes a NFC reader 102 configured to transmit a radio frequency (RF) signal (i.e., a NFC signal) which contains RF power. The NFC system 100 further includes a NFC target device 104 that is in selective communication with the NFC reader 102. In one example, the NFC target device 104 is a passive NFC chip or tag. In another example, the NFC target device 104 is a powered NFC device, such as a Smartphone, a tablet computer, or the like.

The NFC tag 104 is configured to receive the RF signal. The NFC tag 104 is further configured to transmit a response RF signal back to the NFC reader 102. Communications between the NFC reader 102 and the NFC target device 104 are near field communications. In instances where the NFC reader 102 transmits a high fixed transmission power of the RF signal (which may be about 200 to 400 milliwatts), it is believed that a third party 106 can easily eavesdrop on the near field communications between the NFC reader 102 and the NFC target device 104 within a range of, for example, 2 meters or higher.

Referring to FIGS. 2 through 9, one embodiment of a NFC system 200, according to the present invention, is illustrated. The NFC system 200 includes a NFC reader 202, a NFC target device 204 (e.g., a passive tag, etc.) in selective communication with the NFC reader 202, and a NFC transmission power control platform 208 (hereinafter referred to as "platform 208"). The NFC reader 202 is configured to transmit an RF signal, and the NFC target device 204 is configured to receive the RF signal.

As previously mentioned, the platform 208 is disposed between the NFC reader 202 and the NFC target device 204. In one embodiment, the platform 208 is attached directly to the back of the NFC reader 202. The platform 208 may be attached to the NFC reader 202 by a suitable mechanism such as an adhesive. It should be appreciated that the NFC reader 202 does not know that the platform 208 is present. It should also be appreciated, that in this way, the NFC reader 202 does not have to be modified in any way to account for the platform 208.

As will be described in further detail below, the platform 208 includes circuitry for regulating the power of the RF signal so that the regulated RF signal contains an actual amount of RF power needed to sustain near field communications between the NFC reader 202 and the NFC target device 204. This actual amount of RF power is smaller than the initial RF signal. More specifically, the regulated RF signal contains an actual amount of RF power needed for near field communication from the NFC reader 202 to the NFC target device 204. In one embodiment, the regulated RF signal contains an amount of RF power needed to sustain reliable near field communications within a close distance (e.g. within a communication range of less than a few centimeters) from the NFC reader 202 to the NFC target device 204.

Typically, different NFC readers tend to transmit RF signals with different amounts of RF power. Additionally, NFC target devices may require different amounts of RF power to work properly. Due, at least in part, to these sensitivities, there is no prior knowledge of the RF signal strength that is needed to sustain near field communications between the NFC reader 202 and the NFC target device 204. Accordingly, the platform 208 of the NFC system 200 dynamically adjusts the amount of RF power of the RF signal to determine the amount of RF power that is actually needed to sustain near field communications between the NFC reader 202 and the NFC target device 204. Said differently, the platform 208 dynamically adjusts the amount of RF power transmitted from the NFC reader 202 so that the RF signal is just strong enough to support bi-directional near field communications between the NFC reader 202 and the NFC tag 204. In one embodiment, the platform 208 dynamically adjusts the power of the RF signal transmitted by the NFC reader 202 by dynamically regulating the strength of the RF signal. It should be appreciated that the regulated signal is then used to sustain the near field communications between the NFC reader 202 and the NFC target device 204.

The amount of RF power needed for near field communication from the NFC reader 202 to the NFC target device 204 is determined during an NFC discovery process. During the NFC discovery process, the platform 208 tests a range of different RF signal strengths of the NFC reader 202 to determine if bi-directional near field communications between the NFC reader 202 and the NFC target device 204 can be supported/sustained.

Figure 3:
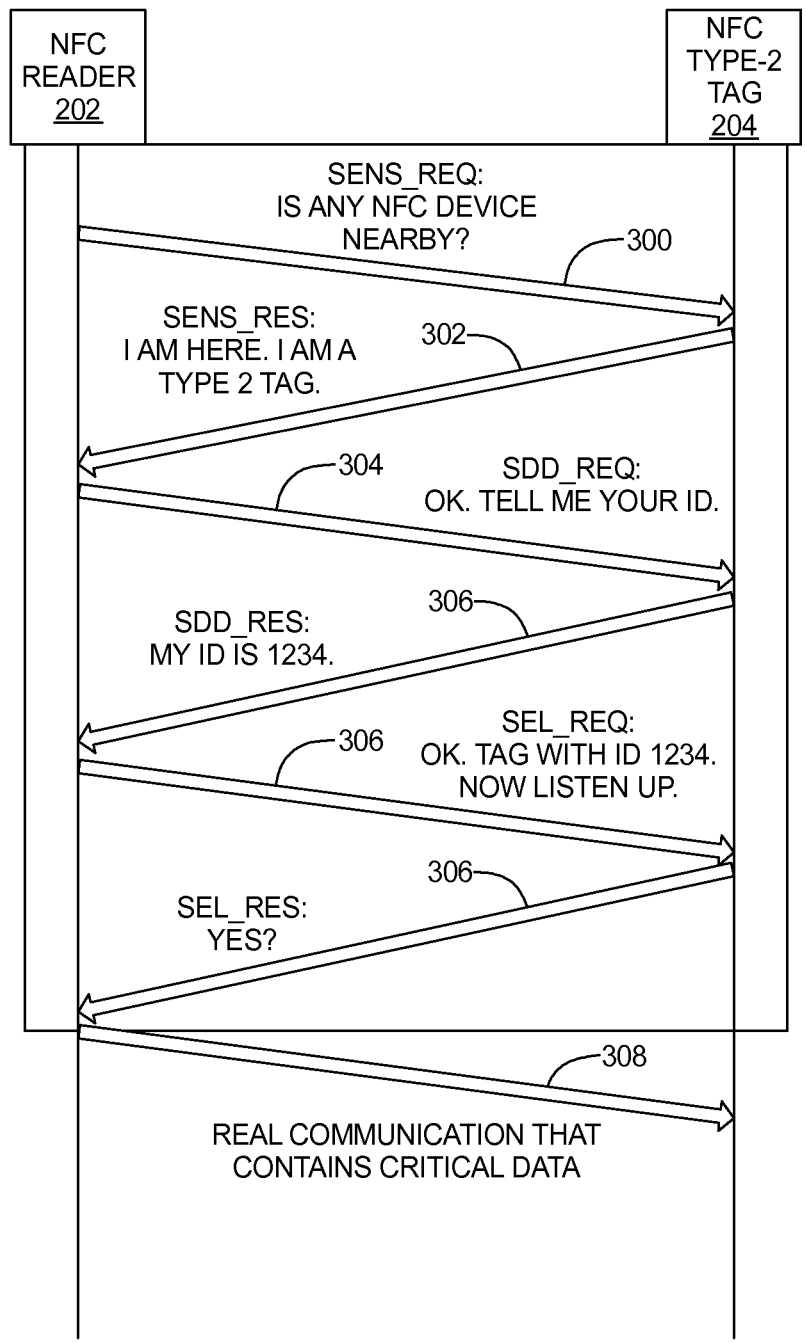
FIG. 3 is a diagrammatic view illustrating near field communications between a NFC reader and a NFC target device of the NFC system of FIG. 2.

Referring to FIG. 3, during the NFC discovery process, the NFC reader 202 broadcasts NFC discovery probes, which is identified by arrow 300. The discovery probes are broadcast at a frequency of about 3 to 6 Hz, depending on the type of NFC reader 202 (e.g. a Smartphone, a tablet computer, etc.) that the platform 208 is attached. If a NFC target device (such as the NFC target device 204) hears the probe, then the NFC target device 204 will send an acknowledgement message back to the NFC reader 202. The sending of the acknowledgement message is identified by arrow 302. The NFC reader 202 will then confirm the discovery of the NFC target device 204 by broadcasting a response, which is identified by arrow 304. Then, the two devices (i.e., the NFC reader 202 and the NFC target device 204) exchange messages back and forth so that the NFC reader 202 and NFC target device 204 can learn about each other's operating parameters, capabilities, etc. The exchanging of the messages is identified by arrows 306, and occurs before near field communications containing critical data is transmitted between the NFC reader 202 and the NFC target device 204. After the NFC discovery process is complete, near field communications that contain critical data take place between the NFC reader 202 and the NFC target device 204. The transmitting of the near field communications that contain critical data is identified by arrow 308. It should be appreciated that the NFC discovery process may require multiple NFC reader 202 responses/messages so that the NFC reader 202 and NFC target device 204 can learn about one another. It should also be appreciated that the NFC reader 202 transmits responses/messages after the previous responses/messages are successfully received by the NFC target device 204.

Figure 4:
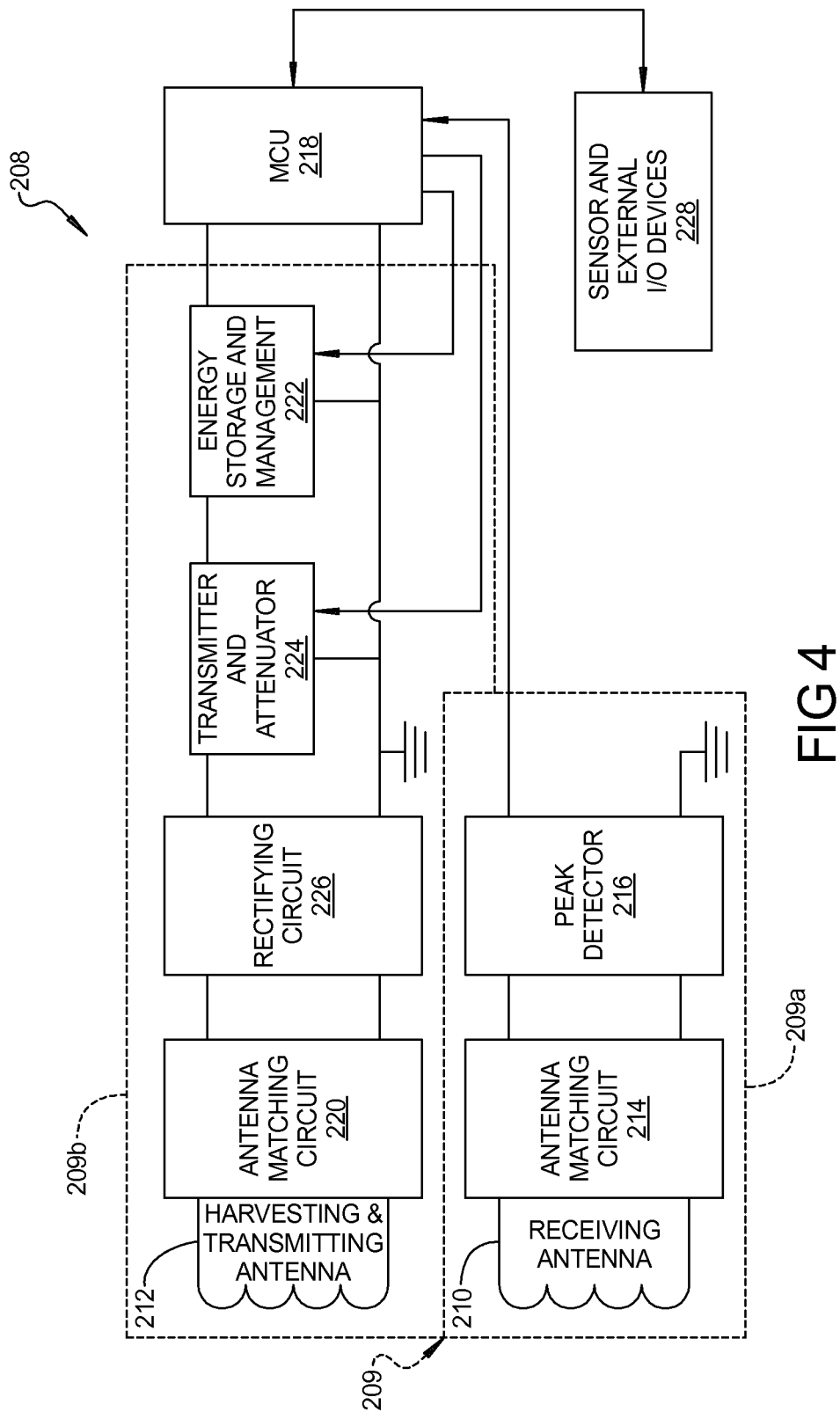
FIG. 4 is a diagrammatic view of one embodiment of an NFC transmission power control platform of the NFC system of FIG. 2.

Referring to FIG. 4, one embodiment of an architecture of the platform 208 is shown. The architecture of the platform 208 generally includes at least one circuit 209. The circuit 209 further includes a first circuit 209a and a second circuit 209b. The first circuit 209a is utilized during the NFC discovery process described above. As illustrated, the first circuit 209a includes a first antenna 210 for receiving RF signals. The first circuit 209a also includes a first antenna-matching circuit 214 that connects with the first antenna 210, which is utilized to tune the first antenna 210 to resonate on a particular frequency. In one embodiment, the first antenna 210 is tuned to resonate on a 13.56 MHz frequency, which is the same frequency as a carrier frequency for NFC signals. When transmitted, the original RF signal is an AM signal.

Figure 7:
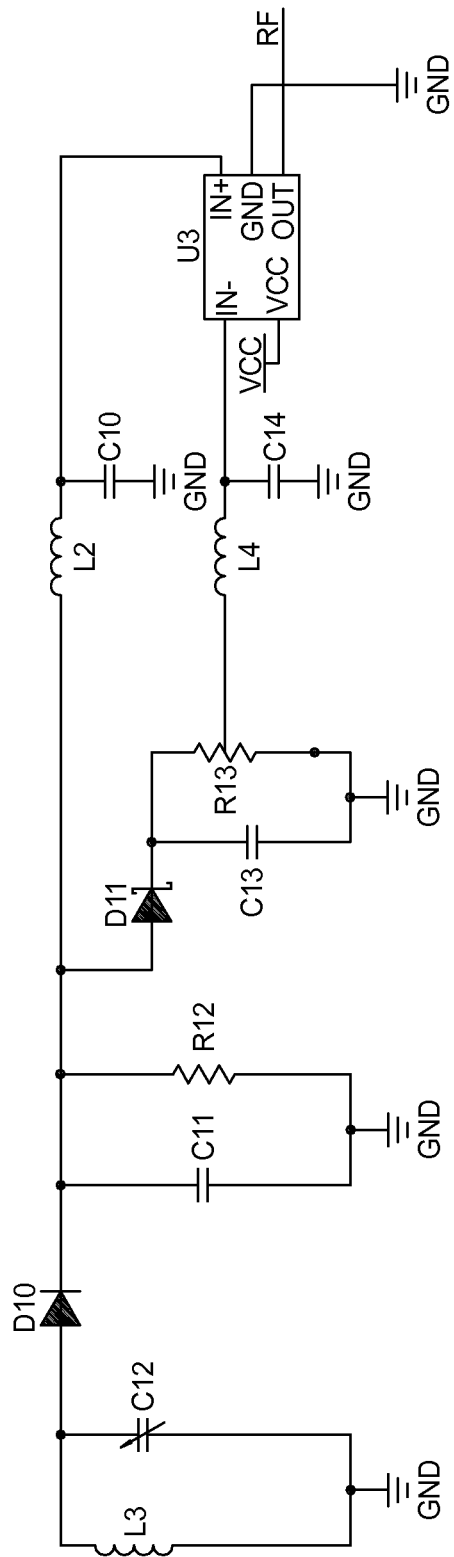
FIG. 7 is a schematic view of a NFC signal receiving circuit of the NFC transmission power control platform of FIG. 4.

The first circuit 209a also includes a peak detector 216 connected to the antenna-matching circuit 214 and operatively connected to the first antenna 210. The peak detector 216 is utilized to demodulate the AM signal from the first antenna 210 and to convert the AM signal to a baseband signal. It should be appreciated that the baseband signal communicates with a microcontroller 218 to be described. It should also be appreciated that the circuitry of the first circuit 209a is also illustrated in FIG. 7 to be described.

Referring to FIG. 4, the architecture of the platform 208 includes a control unit (e.g. a microcontroller or MCU) 218 in communication with the circuit 209. The baseband signal is transmitted from the peak detector 216 to the microcontroller 218, where the baseband signal is decoded. The microcontroller 218 uses the decoded signal to then determine the actual amount of RF power needed to sustain near field communications between the NFC reader 202 and the NFC target device 204. Specifically, the microcontroller 218 examines the existence of the NFC reader's response, e.g., signal 304 referred to in FIG. 3, to determine if the amount of RF power being used can sustain near field communications. In one embodiment, if the signal 304 is detected, then the microcontroller 218 decides that the amount of RF power being used could sustain near field communications between the NFC reader 202 and the NFC target device 204. In another embodiment, if the signal 304 is not present, then the microcontroller 218 decides that the amount of RF power being used could not sustain near field communications. It should be appreciated that the microcontroller 218 may decode several baseband signals during the NFC discovery process until the microcontroller 218 has obtained enough information to determine the amount of RF power needed to sustain the near field communications. For instance, the microcontroller 218 may utilize different amounts of RF power in a few rounds or iterations to find the actual amount of RF power needed to sustain near field communications. It should also be appreciated that the microcontroller 218 adjusts the amount of RF power adopted in near field communication using the RF power or load modulator/regulator 224 described subsequently in the second circuit 209b.

Figure 6:
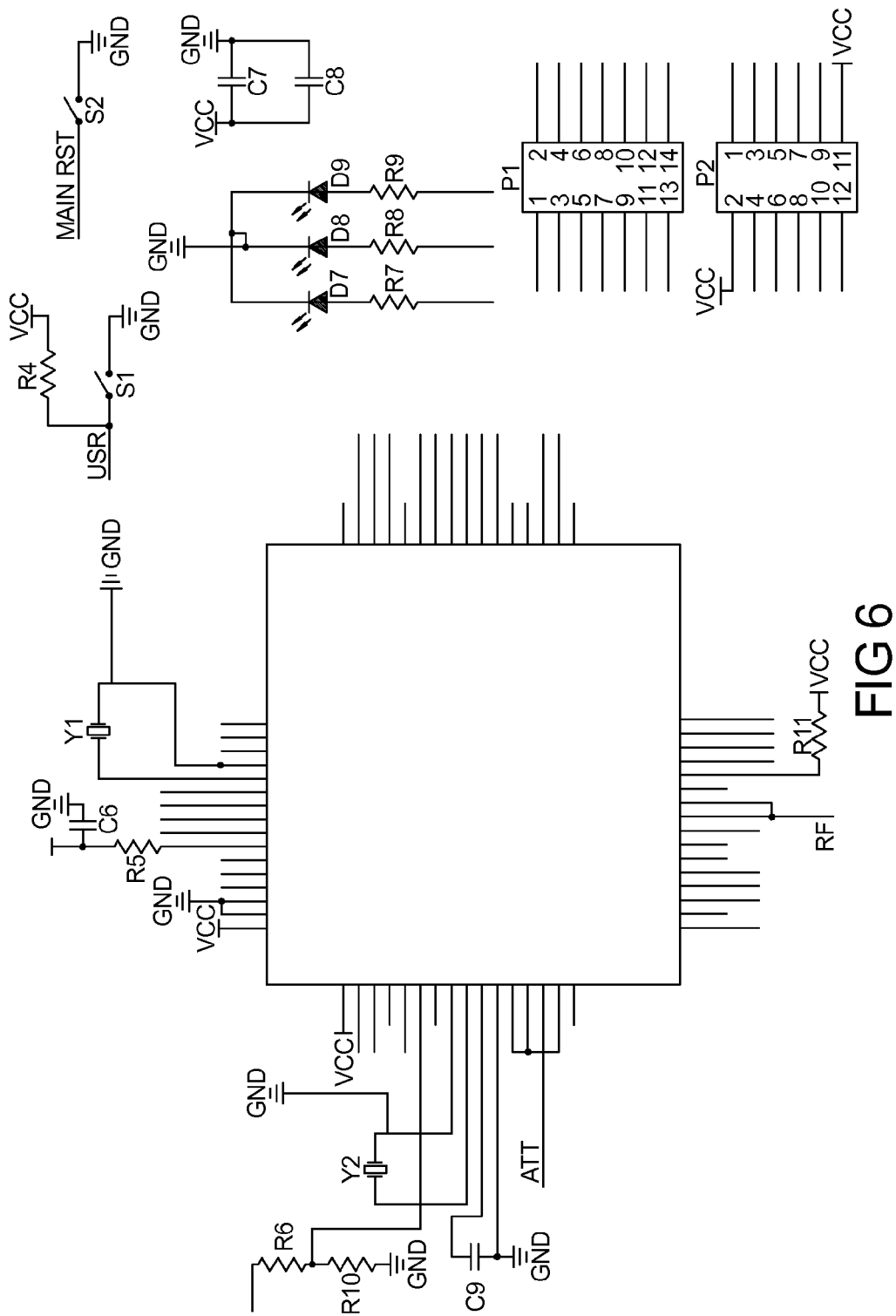
FIG. 6 is a schematic view of a microcontrol unit and periphery circuitry of the NFC transmission power control platform of FIG. 4.

The microcontroller 218 may adopt any one of the following strategies for determining the amount of RF power needed for near field communications. First, the platform 208 can try RF power settings in a fixed low-to-high order, where the platform 208 starts with the lowest RF power setting and increases the field strength each round until the NFC reader 202 response shows up. Second, the platform 208 can try RF power settings in a fixed high-to-low order, where the platform 208 starts with the highest RF power setting and decreases the field strength each round until the NFC reader 202 response disappears. In instances where there are multiple NFC reader 202 responses, the fixed high-to-low order strategy may require testing of multiple RF power settings within a single round. Third, the platform 208 can try RF power settings with a binary search. In this strategy, the platform 208 starts in the middle of the RF power setting. Depending on whether the NFC reader response shows up, the platform 208 discards some of the RF power settings that would not contain the optimal setting. For instance, if no reader response shows up, then the settings lower than the middle point are discarded, and visa versa. It should be appreciated that the process is repeated with the similar remaining settings until only a single setting is left, which is the optimal setting. It should also be appreciated that a schematic of the microcontroller 218 including circuits for decoding during the NFC discovery phase as illustrated in FIG. 6 to be described. It should further be appreciated that the circuit 209 is configured to determine an actual amount of RF power needed to sustain near field communications between the NFC reader 202 and the NFC target device 204 and configured to regulate the RF signal so that the regulated RF signal contains the actual amount of RF power needed to sustain the near field communications between the NFC reader 202 and the NFC target device 204.

Referring again to FIG. 4, the second circuit 209b includes a second antenna 212. The second circuit 209b also includes a second antenna-matching circuit 220 that connects with the second antenna 212, which is utilized to tune the second antenna 212 to resonate on the same frequency as the carrier frequency for NFC signals. In one embodiment, the second antenna 212 is designed to transmit data back to the NFC reader 202. For instance, the second antenna 212 is designed to transmit RF signals containing feedback messages to the NFC reader 202. The signal containing the data is created utilizing a load-modulation technique, and the second antenna 212 transmits this load-modulated signal to the NFC reader 202. After determining the amount of RF power needed to sustain near field communications between the NFC reader 202 and the NFC target device 204, the RF signal transmitted to the NFC target device 204 is regulated to contain the actual amount of RF power. It should be appreciated that the strength of the RF signal is regulated utilizing an optimal RF power setting as determined during the NFC discovery process. It should also be appreciated that near field communications containing critical data takes place between the NFC reader 202 and the NFC target device 204 utilizing the regulated RF signal.

As illustrated in FIG. 4, the second circuit 209b further includes an energy storage and management 222 connected to the microcontroller 218. As previously mentioned, the platform 208 is further designed to harvest (e.g. absorb) excessive RF power. The energy storage and management 222 produces a regulated DC voltage. It should be appreciated that, when the NFC target device 204 is present, the excessive RF power is harvested according to the RF power setting previously determined during the NFC discovery process. It should also be appreciated, however, that when the NFC target device 204 is not present, the platform 208 harvests as much RF power as possible. Furthermore, the harvested RF power (which may be the excessive RF power (if the NFC target device 204 is present) or as much RF power as possible (if the NFC target device 204 is not present) is stored (e.g., in the energy storage and management 222) and ultimately used as an energy reserve to power at least the platform 208. In one embodiment, the RF power is harvested and stored by the energy storage and management 222 of the second circuit 209b. The energy storage and management 222 is generally referred to herein as a harvesting circuit.

Figure 8:
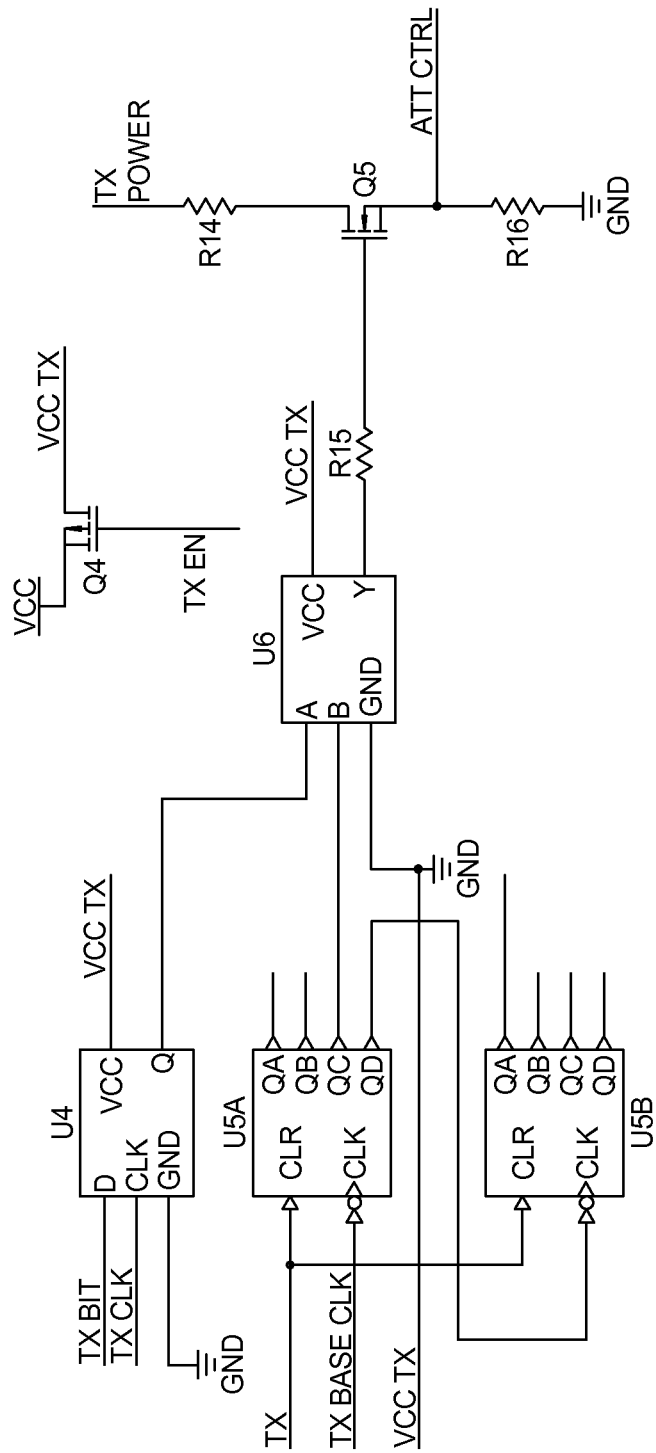
FIG. 8 is a schematic view of a NFC signal transmission circuit of the NFC transmission power control platform of FIG. 4.

The second circuit 209b also includes a transmitter/attenuator or load modulator/regulator 224 and rectifying circuit 226 in contact with the microcontroller 218. The load modulator/regulator 224 is used to modulate the RF signal to be transmitted back to the NFC reader 202 using the load-modulation technique mentioned above. The load modulator/regulator 224 is further used to regulate the power of the RF signal that would be transmitted to the NFC target device 204. The load modulator/regulator 224 is in contact with the energy storage and management 222. The RF power harvested may then be rectified utilizing the rectifying circuit 226. It should be appreciated that a schematic of the circuitry for the load modulator/regulator 224 is illustrated in FIG. 8 to be described. It should also be appreciated that the microcontroller 218 takes part in controlling the harvesting of the RF power (e.g., the excessive RF power). It should further be appreciated that circuitry for controlling the amount of RF power to be absorbed is shown in the schematic illustrated in FIG. 6. It should further be appreciated that a sensor and/or external I/O devices 228 may communicate with the microcontroller 218.

It is believed that the presence of the second antenna 212 will enable the platform 208 to harvest more RF power than platform designs that utilize a single antenna for both RF signal receiving and RF power harvesting. In one embodiment, the second antenna 212 is specifically designed so that the platform 208 can achieve efficient harvesting of the excessive RF power. It should be appreciated that circuitry of the second circuit 209b of the platform 208 including the second antenna 212, the energy storage and management 222, the load modulator/regulator portion 224, and the rectifying circuit 226 in communication with the microcontroller 218 is illustrated in FIGS. 5, 6, and 8.

Figure 5:
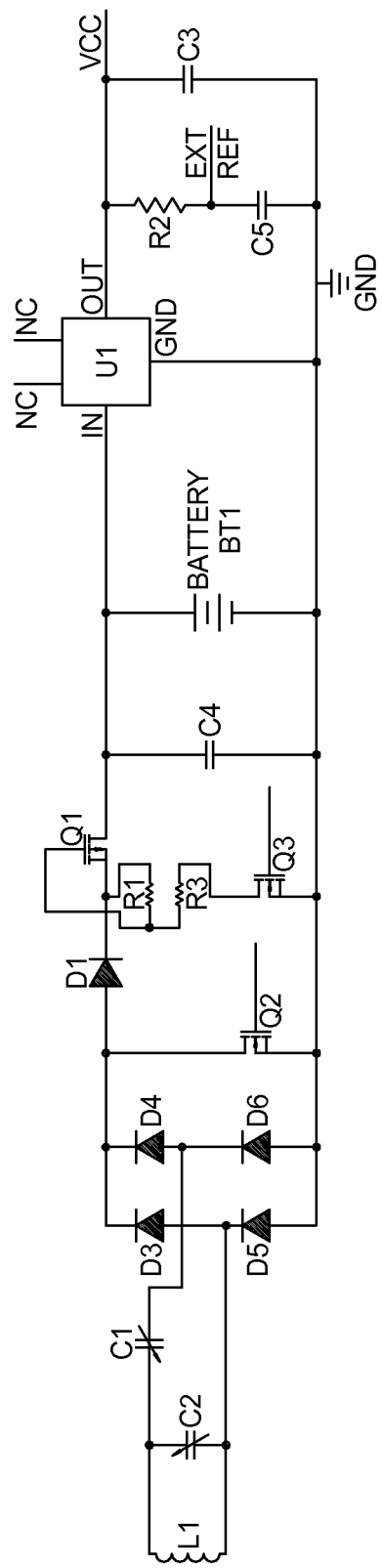
FIG. 5 is a schematic view of a RF power regulating circuit of the NFC transmission power control platform of FIG. 4.

Referring to FIG. 5, the circuitry for regulating NFC transmission power, transmitting NFC signal back to the NFC reader 202, and harvesting excessive RF energy is shown. The circuitry includes an inductor antenna L1 and a first capacitor C1 and a second capacitor C2 connected to L1. L1 is the regulating/transmitting/harvesting antenna. C1 and C2 are an antenna matching circuit to tune the antenna impedance at 13.56 Mhz. The circuitry includes a third diode D3, fourth diode D4, fifth diode D5, and sixth diode D6 connected to C1 and C2, D3, D4, D5, and D6 comprise a bridge rectifier to convert the RF signal to a DC signal. The circuitry includes a first diode D1 connected to the bridge rectifier. The circuitry includes a first transistor Q1, second transistor Q2, and third transistor Q3 and first resistor R1, second resistor R2, and third resistor R3. D1 isolates the load modulator/transmission power regulator (Q2) from the rest of the circuit, so Q2 won't drain the battery BT1. Q2 is the load modulator/transmission power regulator. When transmitting a signal to the NFC reader 202, Q2 acts as a variable load (i.e., load modulator) to antenna L1, causing various amount of energy to reflect back to the NFC reader 202, which carries the data. When regulating the NFC RF power, Q2 acts as a variable energy absorber that can absorb different amounts of energy according to the voltage applied on the gate terminal of Q2, Q1, R1, R3, and Q3 are a switch that enables energy harvesting. The circuitry includes a second capacitor C2, third capacitor C3, fourth capacitor C4, and fifth capacitor C5. R2 and C5 are a low pass filter for generating a reference voltage for the ADC. C4 removes the noise from the harvested energy. The circuitry includes a battery BT1 and ground GND. BT1 is the main energy reservoir of the system. Preferably a Li-ion or Li-po battery. The circuitry includes voltage regulator U1 for regulating the system voltage. It should be appreciated that C3 is the output capacitor for U1.

Referring to FIG. 6, the microcontroller 218 and its peripheral circuitry is shown. The microcontroller 218 is a microcontrol unit U2. U2 is an ultra-low power MSP430 MCU. Y1 generates the reference clock for the transmitter circuit. Y2 is the time keeping clock for the system. The circuitry includes a fifth resistor R5, sixth capacitor C6, and a second switch S2. R5, C6, and S2 are the reset circuit. The circuitry also includes a first switch S1, fourth resistor R4, and a user button for customized functions. The circuitry further includes a second switch S2, seventh capacitor C7, eight capacitor C8, seventh diode D7, eight diode D8, ninth diode D9, sixth resistor R6, seventh resistor R7, eighth resistor R8, ninth resistor R9, tenth resistor R10, and eleventh resistor R11. D7, D8, and D9 are LEDs that can be customized for indicating different system events. It should be appreciated that the peripheral circuitry includes an expansion port and a debug port.

Referring to FIG. 7, the circuitry for the NFC receiving and demodulating is shown. The circuitry includes a second inductor L2, third inductor L3 and fourth inductor L4, an eleventh capacitor C11, a twelfth capacitor C12, a thirteenth capacitor C13, fourteenth capacitor C14, tenth diode D10, eleventh diode D11, and twelfth resistor R12 and thirteenth resistor R13. L3 is the receiving antenna and C12 is its matching capacitor. D10, C11 and R12 are a peak detector which converts the RF signal to a baseband signal by removing the carrier. D11, C13 and R13 are another peak detector but with much slower response. This peak detector captures the maximum voltage of the baseband signal in a window. The voltage on the tap of R13 is tuned to be 95% of the maximum baseband signal voltage. This voltage is adopted as a threshold to detect any modulation of the baseband signal. L4 and C14 are another low pass filter to remove noise on the threshold voltage. The circuitry also includes a comparator U3 which compares the voltage of the baseband signal and the threshold voltage. The output will be set to ground if there is any modulation on the baseband signal, or vcc otherwise. This digitalizes the baseband signal. The baseband signal is then sent to microcontroller 218 for decoding.

Referring to FIG. 8, the circuitry for the transmitter is shown. The circuitry includes U4, U5 (U5A and U5B), and U6. U5 is used for generating a transmission carrier frequency. The reference frequency is provided by the microcontroller 218. U4 and U6 are for aligning the data to be transmitted with the carrier waveform. The circuitry also includes a fourth transistor Q4 and fifth transistor Q5, and a fourteenth resistor R14, fifteenth resistor R15, and sixteenth resistor R16. Q4 is for gating the power of the transmitter circuit. The DAC on the microcontroller 218 controls the modulation index during transmission, and the amount of power absorbed during NFC power regulation. Q5 encodes this into the height of the pulse that is applied to the gate terminal of Q2.

Figure 9:
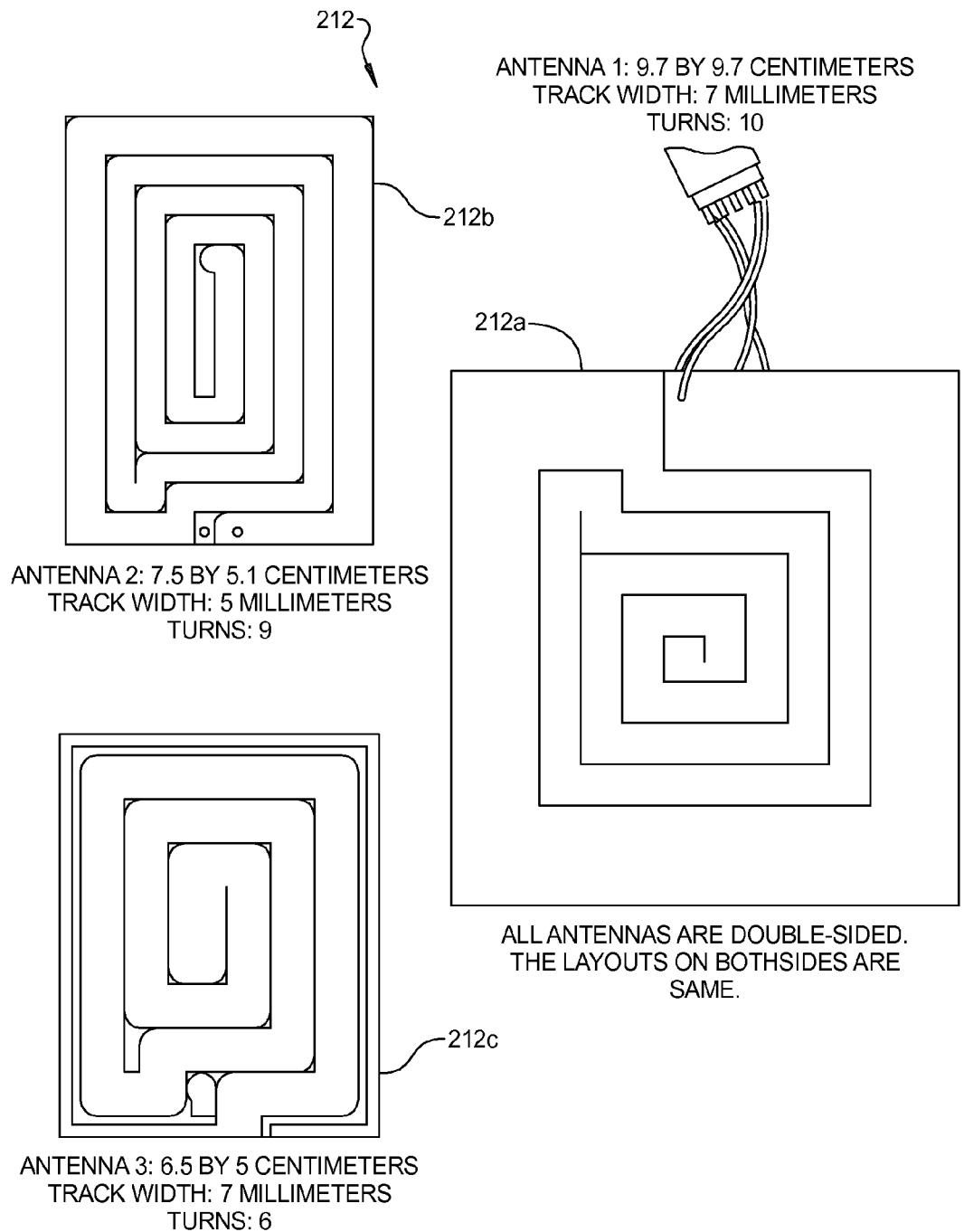
FIG. 9 is a diagrammatic view of multiple embodiments of an antenna for an energy regulating circuit (i.e., a second circuit) of the NFC transmission power control platform of FIG. 4.

Referring to FIG. 9, multiple embodiments of the second antenna 212 is generally shown. In all embodiments, the second antenna 212 is double-sided and the layouts on both sides are the same. In all embodiments, the second antenna 212 is generally rectangular in shape, but may have any suitable shape. In all embodiments, the second antenna 212 has a predetermined size and number of turns. In one embodiment, the second antenna 212a is 9.7 by 9.7 centimeters with a track width of 7 millimeters and 10 turns. In another embodiment, the second antenna 212b is 7.5 by 5.1 centimeters with a track width of 5 millimeters and 9 turns. In yet another embodiment, the second antenna 212c is 6.5 by 5 centimeters with a track width of 7 millimeters and 6 turns. It should be appreciated that the second antenna 212a, 212b, 212c is the second antenna 212 for an energy regulating circuit (i.e., a second circuit 209b) of the NFC transmission power control platform 208.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A near field communication (NFC) system comprising:
   a NFC reader configured to transmit a radio frequency (RF) signal having an initial amount of RF power;
   a NFC target device in selective communication with the NFC reader; and
   a separate NFC transmission power control platform disposed between the NFC reader and the NFC target device, wherein the NFC transmission power control platform comprises:
      a microcontroller; and
      at least one circuit in communication with the microcontroller and configured to determine an actual amount of RF power needed to sustain near field communications bi-directionally between the NFC reader and the NFC target device and configured to dynamically regulate a strength of the RF signal so that the regulated RF signal contains the actual amount of RF power needed to sustain the near field communications bi-directionally between the NFC reader and the NFC target device.

2. A NFC system as set forth in claim 1 wherein said at least one circuit comprises a first circuit to determine an actual amount of RF power needed to sustain near field communications between the NFC reader and the NFC target device and a second circuit to regulate the RF signal so that the regulated RF signal contains the actual amount of RF power needed to sustain the near field communications between the NFC reader and the NFC target device.

3. A NFC system as set forth in claim 2 wherein said first circuit comprises a first antenna for receiving the RF signal and a peak detector connected to said first antenna for converting the RF signal into a baseband signal suitable for transmission to said microcontroller.

4. A NFC system as set forth in claim 2 wherein said second circuit includes a second antenna and a second antenna-matching circuit connected to said second antenna for tuning said second antenna to resonate on the same frequency as the carrier frequency for NFC signals.

5. A NFC system as set forth in claim 2 wherein said second circuit includes a load modulator/regulator to modulate the RF signal to be transmitted back to the NFC reader.

6. A NFC system as set forth in claim 2 wherein said second circuit includes a rectifying circuit connected between said antenna-matching circuit and said load modulator/regulator for rectifying the RF power harvested from the RF signal to power at least said platform.

7. A NFC system as set forth in claim 2 wherein said second circuit includes an energy storage and management for storing the excessive RF power to be utilized to power at least one of said platform and a device attached to said platform.

8. A NFC system as set forth in claim 4 wherein said second antenna is 9.7 by 9.7 centimeters with a track width of 7 millimeters and 10 turns.

9. A NFC system as set forth in claim 4 wherein said second antenna is 7.5 by 5.1 centimeters with a track width of 5 millimeters and 9 turns.

10. A NFC system as set forth in claim 4 wherein said second antenna is 6.5 by 5 centimeters with a track width of 7 millimeters and 6 turns.

11. A method for controlling transmission power of a near field communication system including a near field communication (NFC) reader, a NFC target device, and a separate NFC transmission power control platform disposed between the NFC reader and the NFC target device including a microcontroller and at least one circuit in communication with the microcontroller, the method comprising the steps of:
   transmitting a radio frequency (RF) signal having an initial amount of RF power from the NFC reader;
   receiving the RF signal by the NFC target device;
   determining an actual amount of RF power needed to sustain near field communications bi-directionally between the NFC reader and the NFC target device with the at least one circuit; and
   dynamically regulating a strength of the RF signal with the at least one circuit so that the regulated RF signal contains the actual amount of RF power needed to sustain the near field communications bi-directionally between the NFC reader and the NFC target device.

12. A method as set forth in claim 11 including the step of configuring a first circuit of the at least one circuit to determine an actual amount of RF power needed to sustain near field communications between the NFC reader and the NFC target device and configuring a second circuit of the at least one circuit to regulate the RF signal so that the regulated RF signal contains the actual amount of RF power needed to sustain the near field communications between the NFC reader and the NFC target device.

13. A method as set forth in claim 11 including the step of receiving the RF signal with a first antenna of the first circuit and converting the RF signal into a baseband signal suitable for transmission to the microcontroller with a peak detector connected to said first antenna.

14. A method as set forth in claim 11 including the step of providing a second antenna for the second circuit and tuning the second antenna to resonate on the same frequency as the carrier frequency for NFC signals with a second antenna-matching circuit connected to the second antenna.

15. A method as set forth in claim 11 including the step of modulate the RF signal to be transmitted back to the NFC reader with a load modulating/regulator of the second circuit.

16. A method as set forth in claim 11 including the step of rectifying the RF power harvested from the RF signal to power at least the platform with a rectifying circuit of the second circuit.

17. A method as set forth in claim 11 including the step of storing the excessive RF power to be utilized to power at least one of said platform and a device attached to said platform with an energy and storage management of the second circuit.

18. A method as set forth in claim 11 wherein said step of determining the actual amount of the RF power further comprises the steps of:
emitting, by the NFC reader, at least one probe message;
detecting the at least one probe message by the NFC target device;
transmitting a first acknowledgment message from the NFC target device to the NFC reader indicating that the NFC target device is present;
transmitting a second acknowledgement message from the NFC reader to the NFC target device; and
detecting the second acknowledgement message to determine the amount of power need to sustain the near field communications between the NFC reader and the NFC target device.

19. A method for controlling transmission power of a near field communication system including a near field communication (NFC) reader, a NFC target device, and a separate NFC transmission power control platform disposed between the NFC reader and the NFC target device including a microcontroller and a first circuit and a second circuit in communication with the microcontroller, the method comprising the steps of:
transmitting a radio frequency (RF) signal having an initial amount of RF power from the NFC reader;
receiving the RF signal by the NFC target device;
determining an actual amount of RF power needed to sustain near field communications bi-directionally between the NFC reader and the NFC target device with the first circuit; and
dynamically regulating a strength of the RF signal with the second circuit so that the regulated RF signal contains the actual amount of RF power needed to sustain the near field communications bi-directionally between the NFC reader and the NFC target device.

* * * * *